Feb. 27, 1962  Z. JAGIEL  3,022,561
TUBE CLAMP
Filed Oct. 22, 1958
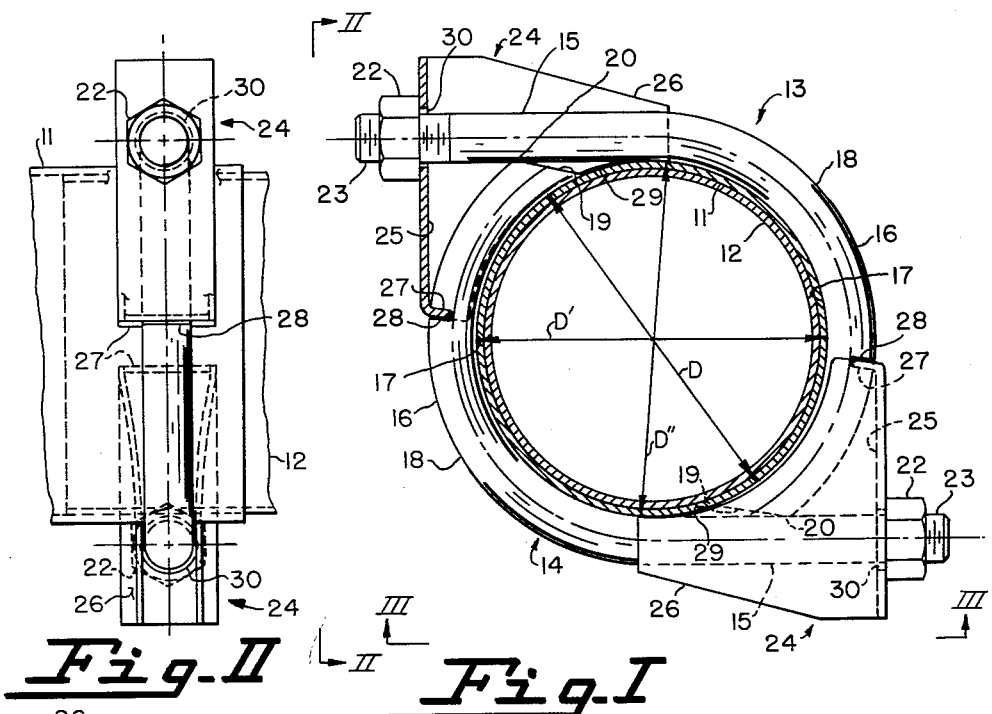
Fig. I
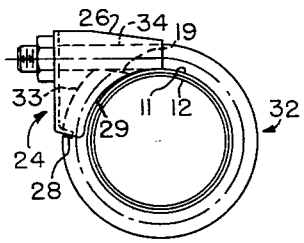
Fig. II
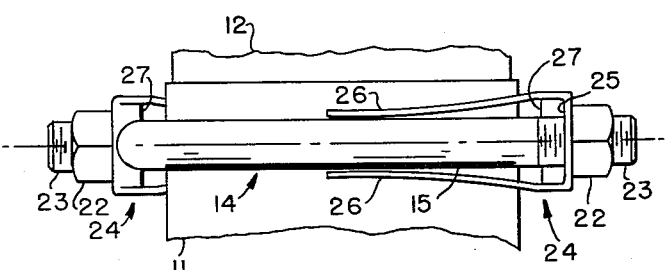
Fig. III
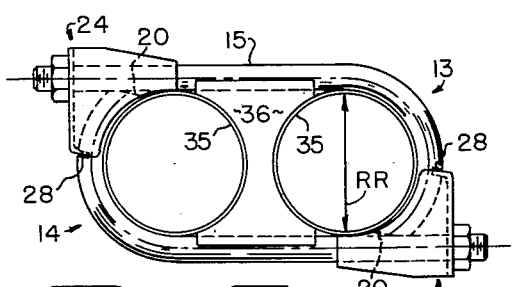
Fig. IV
Fig. V
INVENTOR.
ZIGMUND JAGIEL
BY
Marshall, Marshall & Yeating
ATTORNEYS

United States Patent Office 3,022,561
Patented Feb. 27, 1962

3,022,561
TUBE CLAMP
Zigmund Jagiel, 3106 Algonquin Parkway, Toledo, Ohio
Filed Oct. 22, 1958, Ser. No. 768,943
6 Claims. (Cl. 24—284)

This invention relates to clamps and more particularly to clamps which impose compressive forces radially inward on circular elements.

Heretofore, it has been known to impose compressive forces radially inward on curved and particularly circular elements by various types of clamping structures. Included among those structures are flexible bands which are placed in tension about the members, U-bolts having bar-like structures coupled across the arms of the U and arranged to be drawn toward the bight of the U as by lead screws, U-bolts having saddles extending across the legs of the U, and provided with arcuate cutout portions conforming substantially to the circular member to be clamped and arranged to be drawn toward the bight of the U, and diametrically opposed J-shaped members which are arranged to have their bights drawn toward each other. These clamping means can only partially achieve the objectives for which they were designed inasmuch as the flexible band type of clamp is limited in the extent of pressure which can be developed in a band structure of reasonable dimensions, and most U-bolt and J-shaped clamp structures do not uniformly distribute the pressure developed therein around the full 360° of the circumference of a curved element embraced thereby. These inadequacies are particularly disadvantageous in constructions where it is desired to effect a pressure seal as in the case of telescoped tubes or flexible hoses fitted over rigid circular ferrules. In addition these structures do not adapt themselves to convenient installation in some instances, particularly in the case of U-bolts which must be mounted in relatively inaccessible locations and where clearances are insufficient for the installation of a saddle across the legs of the U.

An object of the present invention is to improve the clamping and sealing action which can be developed on circular elements.

An additional object is to afford a seal by maintaining substantial pressures radially inward on an embraced circular element.

Another object is to facilitate the installation of clamp structures on circular elements.

In accordance with these objects, this invention comprises a clamp construction of one or more elongated member which may be formed from circular rod stock, having a straight shank which is tangential to a curved bight embracing a portion of a path conforming to the cross sectional from of an element to be clamped thereby. Pressure is developed radially inward over a substantial portion of the area of engagement of the elongated member with the embraced element by placing the member under tension. At the junction of the ends of the cooperating elongated members supplemental means are provided to insure that the embraced element is subjected to inwardly directed radial pressure thereby insuring that the embraced element is subjected to radial compression over its entire embracing path. These supplemental means in part comprise a cam surface on the outer face of one portion of an elongated member which is forced inwardly by engagement with the inner face of another portion of an elongated member. Additional compressive forces are provided particularly in the region intermediate adjacent elongated member ends by a bracket which functions as a bell crank in cooperation with the means imposing the tensile and camming forces. The bell crank action is pivoted around a contact area for the bracket with the outer face of one end of an elongated member, and a turning moment is developed from the elongated member and coupled to the bracket by means tending to advance a portion of the bracket spaced from the contact area along the other elongated member end. A turning arm is thereby formed between the contact area and the portion being advanced which tends to turn an extension on the bracket adjacent the embraced element over the region of interest into that element.

In one embodiment the elongated member is formed of two J-shaped sections each having a straight shank and a bight conforming to and adapted to embrace the outer surface of the element to be clamped. The two J-shaped members are arranged to be maintained in diametrically opposed positions such that their rod axes are in a common plane and the opposed bights thereof define essentially 360° of a circle. Means are provided to impose tensile forces on the two shanks of the elements from their respective opposed bights in opposite directions whereby diametrically opposed forces directed radially inward are developed parallel to those shanks and are imposed on the element embraced by their bights. Compressive forces are also developed normal to the shanks by means of faces on the outer portions of the ends of the respective bights which, when the tensile forces are developed, engage the inner face of the shank of the opposed member and are cammed inwardly against the embraced element. Inasmuch as a discontinuity may develop in the inwardly directed radial pressures on the embraced element in the region adjacent the point of camming action, means are provided to develop supplemental forces in that region. These forces are produced by channel-shaped fixtures which are formed as bell crank levers having the sides of the channel extend to the region between the cammed end of the bight and the point of engagement with the clamped element by the opposed shank and formed arcuately to conform essentially to the arc of the cylindrical member being clamped over that region. The bell crank levers are fulcrumed on a bight of one element and have a turning moment developed by the tensioning means for the shank of the opposed element whereby the arcuately formed arms of the crank are forced against the embraced cylindrical member. Since this construction imposes radially inwardly directed forces over the entire 360° of the embraced element, longitudinal leakage paths between telescoped elements upon which this clamp has been applied are eliminated and an effective seal is maintained between those elements. Such a seal is particularly desirable in hose couplings and in the couplings between metal tubes as in the case of telescoped tubes in the exhaust system for an internal combustion engine.

The above and additional objects and features of this invention will be more fully appreciated from a reading of the following detailed description with reference to the accompanying drawing wherein:

FIG. I represents a partially sectioned elevation of a clamp according to this invention taken normal to the axes of a pair of telescoped cylindrical members clamped thereby;

FIG. II is a view of the assemblage of FIG. I taken along the line II—II of FIG. I;

FIG. III is a view of the clamp of this invention taken along lines III—III of FIG. I;

FIG. IV is an elevation of another form of this invention employing a single elongated member; and FIG. V is an elevation of a form of this invention as applied to the clamping of adjacent cylindrical elements.

Referring to FIG. I, the clamp is shown applied to a pair of telescoped metallic tubes as one might encounter in the exhaust system of an internal combustion engine.

An outer tube 11 is telescoped over an inner tube 12 and compressed thereon by the clamp to effect a seal around 360° of the circle depicted in the cross sections of the tubes. J-shaped elements 13 and 14 impose pressures directed radially inward on the outer tube over a substantial portion of its circumference. Each of these elements have a straight shank portion 15 extending tangentially from a semi-circular bight portion 16 defining with its inner face 17 slightly less than 180° of a circle of a diameter equal to or slightly less than the outer diameter of the tube to be clamped. J-shaped elements 13 and 14 are mounted in opposed relationship so that the inner faces of their respective bights define a circle and closely embrace the outer diameter of outer tube 11. The outer face 18 of each bight 16 adjacent the end spaced from the shank 15 is tapered so as to be nearly parallel to the shank 15 of the opposed J-shaped element as shown at surface 19 and to converge slightly toward its own shank 15 whereby a heel 20 is formed which engages with the inner face of the shank of the opposed element. Pressure developed between this opposed shank and heel 20 by a camming action therebetween forces the tip of the bight radially inwardly to impose a pressure along diameter D. Advantageously the elongated members are sufficiently stiff in the region where the camming action occurs that they can be forced along the inner face of the shank as the clamp is tightened.

Pressure is developed radially inwardly along diameter D' by imposing tensile forces on each of the respective shanks 15 of J-shaped elements 13 and 14. These tensile forces may be developed by means of a nut 22 on threaded portion 23 of each shank 15 through the medium of a bracket 24 which is of channel form as viewed in FIG. III and provides a stop or bearing face for the inner face of the nuts 22 when those nuts are tightened on the shanks 15. The bottom 25 of the channel or bracket 24 constitutes the bearing surface and the sides 26 extending from that bottom embrace the J-shaped elements and extend along the shank upon which tension is developed, advantageously to a point beyond that at which the shank merges with the bight 16 and, thus, along a portion of that bight.

Bracket 24 is secured to the opposed J-shaped element by means of a lip 27 extending between the bracket sides 26. Lip 27 projects inward toward the embraced element from bottom 25 to fit within a notch 28 formed in the outer surface of the bight 16 of that opposed J-shaped member. The point of engagement of bracket 24 and the opposed J-shaped member, which may be either between the end of lip 27 and the bottom of notch 28 or between the inner face of bottom 25 and the outer face 18 of the bight, provides a fulcrum and causes the bracket 24 to function as a bell crank when the nut on its associated J-shaped member is tightened to apply pressure at the juncture between the channel bottom 25 forming one arm of the bell crank and the channel sides 26 forming the other arm of the bell crank. The faces 29 of the channel sides 26 adjacent the element to be clamped conform generally to the arc of the adjacent segment of that element. This enables the bell crank function of the bracket to impose compressive forces radially inward along the segment of the tubular circumference between the diameter D and a diameter D'' which is perpendicular to diameter D' thereby providing overlapping compressed regions beneath the edges 29 on either side of the J-shaped members in the regions where the compressive forces developed by those members are either absent or at a minimum.

As nut 22 is tightened on each shank 15 the respective bracket 24 tends to pivot around its fulcrum in the area of notch 28 causing its outer ends 29 on the bracket sides 26 to impose a moment having a component directed radially inward of the embraced element. This tightening also imposes a tensile force on the shank of the respective J-shaped members tending to pull the bights of those members radially inward and in so doing tending to increase the camming force on the heel 20 of the opposed member thereby forcing the segment between diameter D and diameter D' radially inward. It will be noted also that there is some tensile force developed on the opposed J-shaped member at its notch 27 tending to pull the arc between diameter D' and diameter D'' radially inward thereby developing sealing forces in that region as well.

Generally, the method of installing the clamp of this invention is obvious from its construction. Where the clamp is to be positioned adjacent the end of a tubular member as in the telescoping of an exhaust pipe to the input of a muffler, the nuts 22 may be fitted on the shanks 15 of the respective J-shaped elements while the clamp is in its assembled form and slid axially back on one of the tubular sections until the two have been telescoped together whereupon it can be slid to a point in registration with the telescoped portions and tightened by turning the respective nuts. In the alternative, the units can be assembled as subassemblies wherein each J-shaped element with its bracket and nut constitutes a subassembly and two subassemblies are fitted around a body which is to be clamped and manipulated to insert the bracket lips 27 into the notches 28 of the opposed subassemblies whereupon the nuts 22 can be tightened. If necessary, one or both of the subassemblies can be disassembled and once the clamp element is mounted in position, the bracket 24 can be mounted on its J-shaped element 13 or 14 by inserting shank 15 into the aperture 30 in the bottom 25 of the bracket and by fitting the nut 22 onto the threaded portion of shank 15.

A second form of the invention employing a single elongated member 32 is shown in FIG. IV. This clamp is particularly adaptable to hose couplings and like relatively yieldable elements when member 32 is of flexible material which can be wrapped around the coupling, or, in the case of a rigid elongated member, where free access is available to an end of the member to be clamped. The single elongated member is turned upon itself so that it can be made to engage the embraced element over a substantially closed path. The region between the end of its bight 33 and its shank 34 is subjected to compression by elements similar to those discussed above. Cam surface 19 is provided at the end of bight 33 and is arranged to engage the inner face of its own shank and be advanced along that shank to impose a compressive camming action on the embraced element. Channel shaped bracket 24 is fulcrumed from a suitable contact area, as notch 28, on the outer face of bight 33 so that as it is advanced along shank 34 the arms 26 straddling shank 34 have their arcuate faces 29 conforming to the surface contour of the clamped element forced against that element to complete the sealed path around that element.

While a particular form of clamp structure has been employed to illustrate the principles of this invention, it is to be appreciated that these principles are applicable to a number of utilizations wherein it is desirable to produce forces directed radially inward along the arc of a curve which may be circular or otherwise. In another typical application of this clamp the shank portions of the respective J-shaped elements 13 and 14 can be substantially enlarged whereby a pair of circular members are mounted in side-by-side relationship as viewed in cross section. Such a construction is illustrated in FIG. V wherein the shank portions 15 are lengthened sufficiently to enable the clamp to embrace two adjacent members 35 of circular cross section and an intermediate conforming saddle 36. The operating functions of the clamp structure correspond to those discussed above in that the imposition of the tensile forces on the J-shaped shanks impose forces radially inward and tend to force the two circular members against saddle 36 or against each other if no saddle is employed. Similarly, the camming action of the shank of one element against the heel 20 on the end of the bight of its opposed element together with the bell crank action of the respective brackets 24 develop inward radially directed forces from the bracket and region of the cam surface normal to the line RR and, incidental thereto, opposing radial forces from the opposite side of the line RR. A construction of the nature shown in FIG. V is particularly adaptable to the coupling of scaffolding elements.

In some applications it has been found inconvenient to employ a four piece clamp since the pieces can become misaligned during installation. The features of this invention can be retained while reducing the structure to a two piece clamp by securing brackets 24 to their respective bights 16 so that each bracket-J-shaped element subcombination is a unitary structure. One means of accomplishing this is by tack welding the two together in the region of the slot 28 and lip 27 so that the pivoting around the fulcrum in that region is essentially unimpaired. Clamps constructed as in FIG. I have been modified in this manner so that a tack weld forms a fillet from the outer face of lip 27 to the exposed wall defining notch 28 with marked advantage in handling. Such clamps are equally as effective as those made of four pieces and can often be installed more conveniently.

It is also recognized that the clamp structure of this invention lends itself to the addition of supporting elements. Thus, ears or lugs might be made integral with bracket 24 which would facilitate the securing of one or both of those brackets to an adjacent framework or other structure or in the alternative, the shanks 15 of the J-shaped elements 13 might perform coupling functions in cooperation with other supporting elements not shown.

The above description is intended to set forth the typical clamp constructions according to this invention. However, it is evident that these concepts are applicable to a number of utilizations not depicted herein. Accordingly, it is to be understood that the structures shown are to be read as illustrative only and not in a limiting sense and that the functions and structural combinations disclosed can be applied in other embodiments without departing from the spirit and scope of this invention.

What is claimed is:

1. A clamp for embracing a cylindrical element comprising a pair of elongated members, a straight shank on each member, a curved bight on each member having an inner face generally conforming to a portion of said cylindrical element, a cam surface on the outer face of each bight adjacent its end, the outer face of each bight having a notch spaced from its end, said members being positioned on opposite sides of an embraced cylindrical element in diametrically opposed relationship, a channel shaped coupling between the shank of each member and the bight of the opposite member, a bottom for each channel generally parallel to a tangent to the bight which it couples and intersected by the shank which it couples, an inturned lip on said bottom hooked into said notch, each bottom having an aperture for its respective intersecting shank, walls for each channel extending along and straddling the intersecting shank, an arcuate edge on each wall adjacent to and engageable with said element over a region from the end of the bight coupled by said coupling to the junction of the shank coupled by said coupling with the bight integral therewith, a thread on each shank, a nut on each thread bearing against said channel bottom whereby the advance of each nut on its shank turns the respective channel about its lip to advance said edges toward said element and each of said cam surfaces is engaged with and advanced along the inner face of the shank of its opposed member.

2. A clamp for an essentially circular member comprising a pair of J-shaped elements each having a shank and a bight turned through a circular path essentially 180° from said shank and of essentially the same diameter as said member, a tapered tip on the outer end portion of each of said bights having a camming surface, means to sustain said J-shaped elements in diametrically opposed relationship to each other with their respective cam surfaces engaging the inner surface of the opposed shank to embrace an essentially circular area including said member, means supported on each shank and engaging the outer face of the respective opposed bights, said means being in the form of a bell crank having one arm extending from a point of engagement with an opposed bight to the point of engagement with its respective shank and a second arm extending from the point of engagement with said respective shank to an arcuate seat generally conforming to an arc of the circumference of said member, said arcuate seat engaging said member adjacent the region between the juncture of the respective shank with its bight and the end of the opposed bight and overlapping the bight portions defining said region, and means to advance said shank supported means along said shank and towards its respective bight.

3. In a clamp for cylindrical members comprising cooperating cylinder embracing elements having inner faces arranged to conform to and engage a cylinder over adjacent portions of the perimeter of a right section of the cylinder, a junction between said elements providing, when said elements are mounted on a cylinder, a line of inwardly directed forces across the surface of the cylinder adjacent the region between the portions of the elements in engagement with the cylinder, said junction comprising an extension on a first of said elements projecting generally tangentially from the cylinder engaging face of said first element, a first cam surface on the outer face of the second of said elements adjacent its end, a cam surface on the face of said extension of said first element most proximate said cylinder engageable by said first cam surface, a channel shaped coupling between said extension and said second element, said coupling forming a bell crank, a bottom for said channel shaped coupling generally parallel to a tangent to the cylinder and intersected by said extension, said bottom having an aperture for said extension, walls for said channel extending along and straddling said extension and the portion of said second element having the cam surface to maintain said surface in alignment with said extension, an area spaced along said bottom from said aperture secured to and bearing on the outer face of said second element to form a first pivot for said bell crank, means to advance said extension through said aperture to draw said elements together and rotate said coupling around said first pivot, and a pair of arcuate edges on said walls generally conforming to the subjacent surface of said cylindrical member and engaging that surface adjacent the region of that surface between the areas of contact of said elements with said cylinder and overlapping said areas of contact of said elements with said cylinder.

4. In a clamp for cylindrical members said clamp having a pair of interconnected curved elements, a shank integral with a first of said elements, a cam surface on the convex outer face of a second of said elements adjacent its end, a channel shaped coupling between said elements, a bottom for said channel shaped coupling parallel to a tangent to said second element and intersecting said shank, said bottom having an aperture for said shank, walls for said channel extending along and straddling said shank and the cam surface of said second element, an area spaced along said bottom from said aperture secured to and bearing on the outer face of said second element, a pair of arcuate edges on said walls positioned to conform to and engage said cylindrical member to be clamped over the region between the end of said second element and the juncture of said first element with its shank, and means to advance said shank through said aperture whereby said edges are turned about said bearing area and forced against said cylinder and said cam surface is engaged with and advanced along the inner face of said shank.

5. A coupling between a curved bight having an inner face generally conforming to a portion of a cylindrical surface to be compressed thereby and a shank extending generally tangentially from said cylindrical surface, said coupling comprising a cam surface on the outer face of said bight adjacent its end and adapted to be engaged by the surface of said shank tangential to said cylindrical surface, the outer surface of said bight having a notch spaced from its end, a channel-shaped member between said shank and said bight, a bottom for the channel generally parallel to a tangent to the bight and intersected by said shank, an inturned lip on said bottom hooked into said notch, said channel bottom having an aperture through which the intersecting shank projects, walls for said channel extending along and straddling the shank, an arcuate edge on each wall adjacent to and engageable with the cylindrical surface over a region from the end of the bight to the point of tangency to the cylindrical surface of said shank, and means for advancing said shank through said aperture whereby the channel is turned about its lip and said arcuate edges are advanced toward said cylindrical surface and whereby said cam surface is engaged with and advanced along the inner face of said shank.

6. A clamp comprising a pair of J-shaped rods each having a shank and a bight turned essentially 180 degrees from said shank, a bracket supported on the shank of each rod and engaging the outer face of the bight of the cooperating rod to sustain the J-shaped rods in diametrically opposed relationship, means for drawing each said bracket along its respective shank and toward the bight integral with the cooperating shank, an arm on said bracket extending parallel to the shank on which the bracket is supported, said arm forming with the bracket portion between the point of engagement of said bracket with said bight and the point of support of said bracket on said shank a bell crank, and an arcuate face on said opposed arm adjacent the region between the inner faces of said bights and overlapping the portions of both bights which define said region, said arm being arranged to be displaced radially inwardly of said bights as said bracket is advanced along its supporting shank.

References Cited in the file of this patent
UNITED STATES PATENTS

| | | |
|---|---|---|
| 470,344 | Baldwin | Mar. 8, 1892 |
| 978,619 | Morgan | Dec. 13, 1910 |
| 1,214,308 | Inglis et al. | Jan. 30, 1917 |
| 1,309,476 | Hill | July 8, 1919 |
| 2,091,916 | Evans | Aug. 31, 1937 |
| 2,651,094 | Dodge | Sept. 8, 1953 |

FOREIGN PATENTS

| | | |
|---|---|---|
| 19,971 | Australia | May 10, 1930 |
| 144,580 | Austria | Feb. 10, 1936 |
| 157,571 | Sweden | Jan. 15, 1957 |
| 191,944 | Great Britain | Jan. 25, 1923 |
| 514,307 | Great Britain | Nov. 6, 1939 |
| 645,527 | France | June 27, 1928 |